US005172130A

United States Patent [19]

Takahashi

[11] Patent Number: 5,172,130

[45] Date of Patent: Dec. 15, 1992

[54] METHOD AND APPARATUS FOR REGULATING THERMAL RECORDING HEAD TEMPERATURE

[75] Inventor: Masatomo Takahashi, Tokyo, Japan

[73] Assignee: Canon Kabushiki Kaisha, Tokyo, Japan

[21] Appl. No.: 360,489

[22] Filed: Jun. 2, 1989

[30] Foreign Application Priority Data

Jun. 6, 1988 [JP] Japan ............ 63-137461
May 26, 1989 [JP] Japan ............ 1-131406

[51] Int. Cl.[5] ............ G01D 9/00; B41J 2/38

[52] U.S. Cl. ............ 346/1.1; 346/76 PH; 346/140 R; 358/296

[58] Field of Search ............ 358/296; 346/76 PH, 346/1.1, 140 PD

[56] References Cited

U.S. PATENT DOCUMENTS 4,366,489 12/1982 Yamaguchi ............ 346/76 PH
4,449,137 5/1986 Inui ............ 346/76 PH
4,963,884 10/1990 Kiguchi et al. ............ 346/1.1

FOREIGN PATENT DOCUMENTS 0295953 12/1988 European Pat. Off. ....... 346/76 PH
0164880 12/1981 Japan .
57-27772 2/1982 Japan .

*Primary Examiner*—Benjamin R. Fuller
*Assistant Examiner*—Huan Tran
*Attorney, Agent, or Firm*—Fitzpatrick, Cella, Harper & Scinto

[57] ABSTRACT

A recording apparatus for effecting recording on a recording medium has a plurality of recording elements, heat generation driver for driving the plurality of recording elements for heat generation by block unit, and control unit for controlling the plurality of recording elements so as to be successively driven for heat generation by block unit during the suspension of the heat generation driving for recording.

27 Claims, 7 Drawing Sheets

METHOD AND APPARATUS FOR REGULATING THERMAL RECORDING HEAD TEMPERATURE

BACKGROUND OF THE INVENTION

1. Field of the Invention

This invention relates to a recording method and a recording apparatus in which recording elements are driven for heat generation to thereby accomplish recording.

The term "recording apparatus" covers, for example, a typewriter, a copying apparatus, a printer and a facsimile apparatus. Also, the recording system to which the present invention is applicable and in which recording elements are driven for heat generation to thereby accomplish recording covers the so-called ink jet recording system, the heat transfer recording system, the thermosensitive recording system and the electrical energization recording system.

2. Related Background Art

A facsimile apparatus to which a thermal printer using the thermosensitive recording system is applied as a recording apparatus will hereinafter be described as an example.

In the recent thermal printers, the heat generating elements of the thermal head are higher in density and precision and designed to be able to record with smaller applied energy. Thus, the heat generating elements of the thermal head have become able to record in quick response to applied energy, but tends to cool down immediately when the application of the energy is stopped. As is well known, in the printing on thermosensitive paper in the thermal printer, the color forming area of the recording paper is varied by the amount of energy applied to the thermal head, and this is affected also by the amount of heat accumulated in the thermal head.

That is, if energy is applied continuously at a predetermined period, the color forming area is stable, but if the period of application of energy becomes long or the downtime of the thermal head becomes long, the thermal head is cooled down, and this leads to the possibility that even if the same energy is applied, the color forming area of the recording paper becomes smaller than the usual color forming area. Also, if the applied energy is set to a great amount with the lengthening of the period of application taken into account, there is the problem that when the thermal head is driven for heat generation at a predetermined period, the color forming area becomes large and the image recording density becomes non-uniform.

However, in the recent recording apparatus having more functions, the period of input of printing data tends to become non-uniform and therefore, such design observing a predetermined recording period strictly is becoming difficult. For example, when a trouble occurs during the reception of recording information, recording is once stopped, and recording is resumed after complete reception of the recording information. This sometimes gives rise to the irregularity of downtime. For this reason, there is a method of preventing the cooling of the thermal head by applying energy to the thermal head again to thereby re-drive the thermal head when the recording period or the downtime has become long, but there has been the problem that if the print timing of the next line occurs during the re-driving, the completion of the re-driving for one line must be waited for and thus the recording time becomes long.

SUMMARY OF THE INVENTION

It is an object of the present invention to provide a recording method and a recording apparatus which can accomplish clear-out recording.

It is another object of the present invention to provide a recording method and a recording apparatus which can accomplish recording uniform in density.

It is still another object of the present invention to provide a recording method and a recording apparatus which can accomplish stable recording even when recording is resumed after long-time suspension of recording.

It is yet still another object of the present invention to provide a recording method and a recording apparatus in which a thermal head is divided into predetermined blocks and respective ones of those blocks are re-driven in the unit of a predetermined time until the thermal head is driven next time, whereby the cooling of the thermal head during the downtime thereof can be prevented to thereby accomplish stable recording.

DESCRIPTION OF THE PREFERRED EMBODIMENT

A preferred embodiment of the present invention will hereinafter be described in detail with reference to the accompanying drawings.

Figure 1:
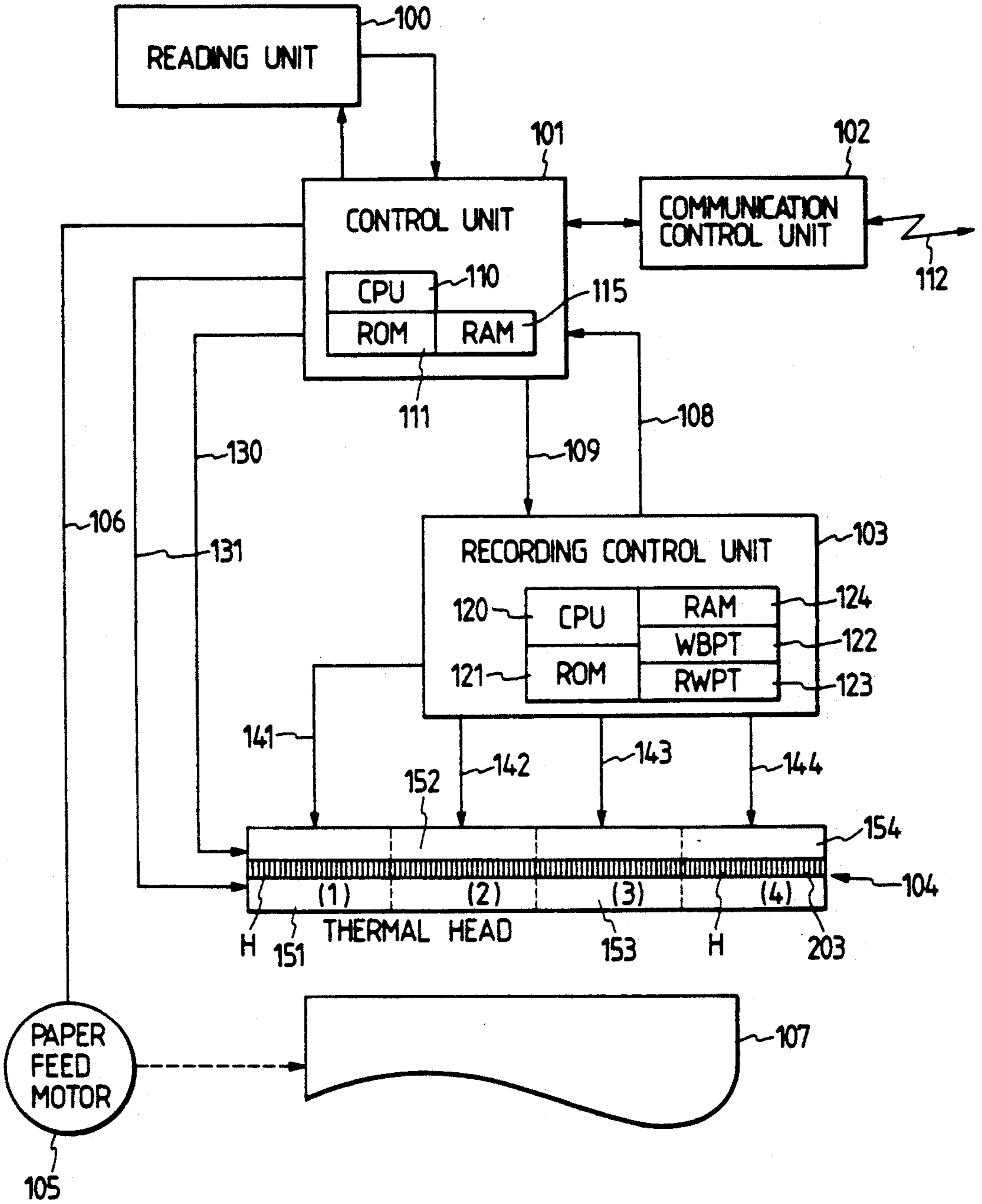
FIG. 1 is a block diagram schematically showing the construction of a facsimile apparatus to which an embodiment of the present invention is applied
Figure 2:
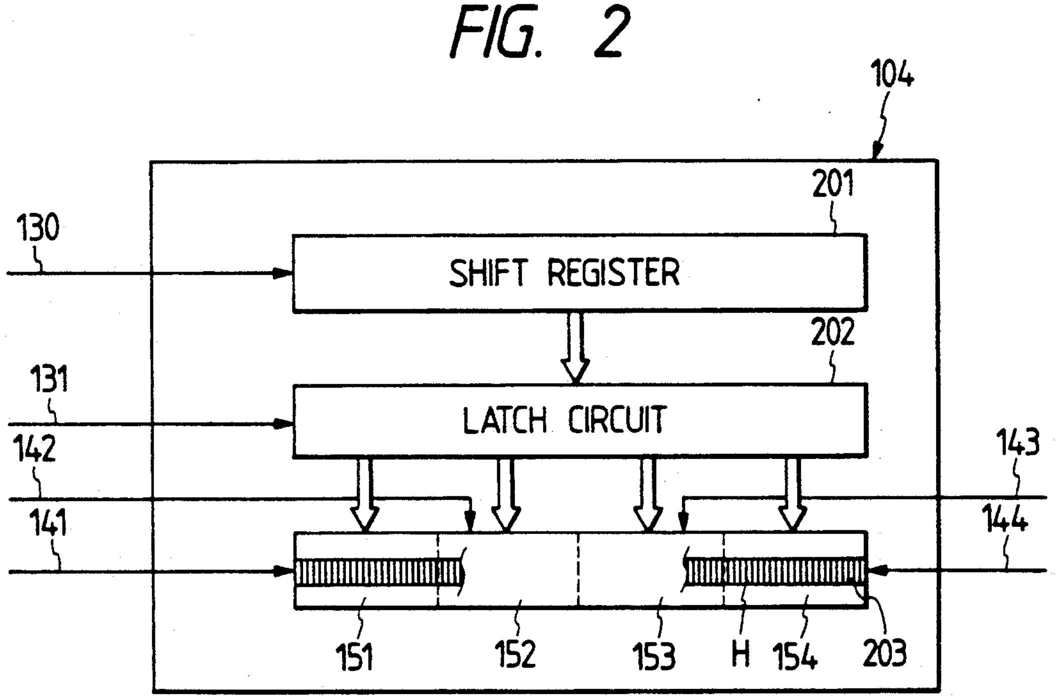
FIG. 2 is a block diagram showing the construction of a thermal head.

Description of a Facsimile Apparatus (FIGS. 1 and 2)

FIG. 1 is a block diagram schematically showing the construction of a facsimile apparatus to which an embodiment of the present invention is applied.

In FIG. 1, the reference numeral 100 designates a reading unit provided, for example, with a CCD 113*i* (FIG. 7) or the like, which unit reads the image of an original, converts it into a digital signal and outputs it as image data. The image data read by this reading unit 100 is output to a control unit 101. The control unit 101 effects the control of the entire apparatus, and receives as an input the original image data read by the reading unit 100 and outputs it to a recording unit provided with a thermal head 104 or the like, and carries out the encoding of the image data and thereafter, outputs it to a circuit 112 through a communication control unit 102. It also decodes the encoded image data or the like input from the circuit 112 through the communication control unit 102 and converts it into image data, and outputs the image data to the thermal head 104 to effect recording. The control unit 101 is provided with a CPU 110 such as a microprocessor, an ROM 111 storing therein the control program of the CPU 110 and various data, a RAM 115 used as the work area of the CPU 110, etc.

The communication control unit 102 effects the net control of the circuit 112 and the modulation and demodulation of data. The reference numeral 103 designates a recording control unit which upon receiving a print command from the control unit 101, outputs strobe signals 141-144 and drives the corresponding blocks 1-4 (151-154) of the thermal head 104 for heat generation, and executes thermosensitive recording. The recording control unit 103 is provided with an ROM 121 storing therein the control program of the CPU 120 and various data, and an RAM 124 used as the work area of the CPU 120 and including a writing block pointer WBPT and a rewrite pointer RWPT which will be described later.

The strobe signal 141 drives the block 1 (151) of the thermal head 104, the strobe signal 142 corresponds to the block 2 (152), the strobe signal 143 corresponds to the block 3 (153), and the strobe signal 144 corresponds to the block 4 (154). The heat generation driving time of each block of the thermal head 104 is determined by the output times of these strobe signals 141-144.

The thermal line head 104 has a length in the widthwise direction of recording paper, and as shown, in this embodiment, it is divided into four blocks 151-154 which are individually electrically energized by corresponding strobe signals 141-144 and driven for heat generation. Thus the entire thermal head 104 is not driven for heat generation at a time, but is divided into blocks which are successively driven for heat generation, whereby the capacity of the power source of the apparatus can be made small. In the present embodiment, the thermal head 104 has 2048 heat generating elements H so as to be able to effect recording up to the size B4 (width 256 mm and length 364 mm), and these heat generating elements H are provided in four blocks (512 elements per block).

Further, the reference numeral 130 denotes recording data and shift clock output serially from the control unit 101 to the thermal head 104, and the recording data is output in synchronism with the shift clock and successively shifted into a shift register 201 which will be described later. The reference numeral 131 designates a latch signal for latching the recording data corresponding to one line stored in the shift register 201 by the latch circuit 202 of the thermal head 104 which will be described later. The reference numeral 105 denotes a paper feed motor rotatively driven by a motor driving signal 106 from the control unit 101 for conveying the recording paper 107, and the recording paper 107 is a recording medium such as thermosensitive paper conveyed by the revolution of the paper feed motor 105.

FIG. 2 is a block diagram showing the construction of the thermal head 104 in the present embodiment. In FIG. 2, the reference numeral 201 designates a shift register for receiving as inputs serial recording data and shift clock 130 from the control unit 101 and retaining them. The reference numeral 202 denotes a latch circuit for latching the output data of the shift register 201 by a latch signal 131. A group of heat generating elements 203 is driven for heat generation on the basis of the data of the latch circuit 202. The group of heat generating elements 203 is divided into four blocks 151-154, each of which is driven by the recording data from the latch circuit 202 and a correspond strobe signal 141-144 from the recording control unit 103.

Description of the Operation of Copying an Original (FIGS. 3-6)

Figure 3:
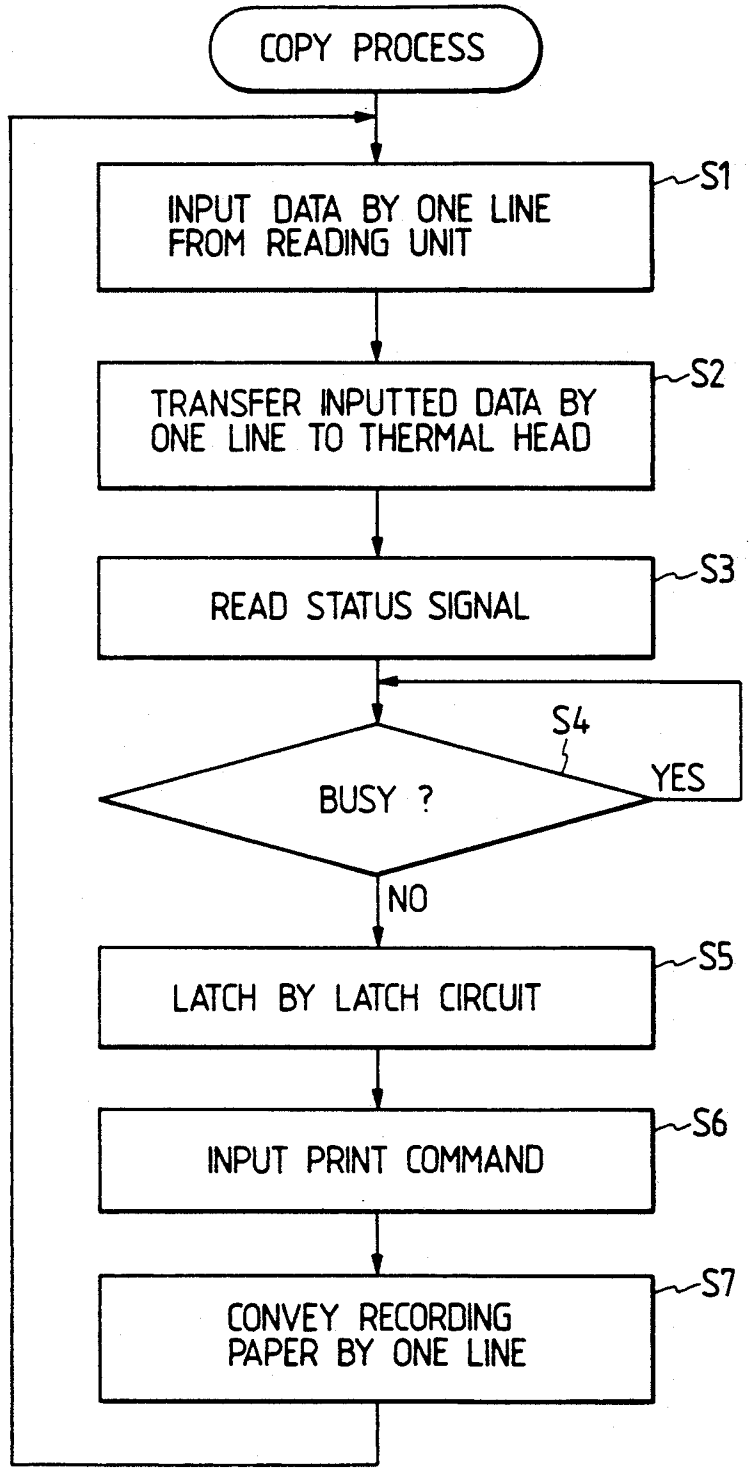
FIG. 3 is a flow chart showing the process of a control unit during the copying operation.

FIG. 3 is a flow chart showing the operation of the control unit 101 during the original copying operation (the operation of reading an original and effecting recording on the recording paper in conformity with the reading) in the present embodiment, and a control program for executing this process is stored in the ROM 111.

This operation is started by a copy command being input from an operation unit or the like, not shown. First, at step S1, an original reading start command is given from the control unit 101 to the reading unit 100, and image data corresponding to one line is input from the reading unit 100. When the inputting of the image data corresponding to one line is completed, advance is made to step S2, where the image data corresponding to one line is serially transferred to the thermal head 104. When the transfer of the image data corresponding to one line is thus completed, advance is made to step S3. At the step S3, a status signal 108 from the recording control unit 103 is read and whether the recording control unit 103 is busy, that is, whether one line recording is going on, is examined.

If one line recording is not going on, advance is made to step S5, where a latch signal 131 is output and recording data corresponding to one line is latched by the latch circuit 202 of the thermal head 104. At step S6, a print command 109 is output to the recording control unit 103, and at step S7, the motor 105 is driven to convey the recording paper 107 by one line. By repetitively effecting the above-described operation for a page of the original, the process of copying a page of the original is executed.

Figure 4:
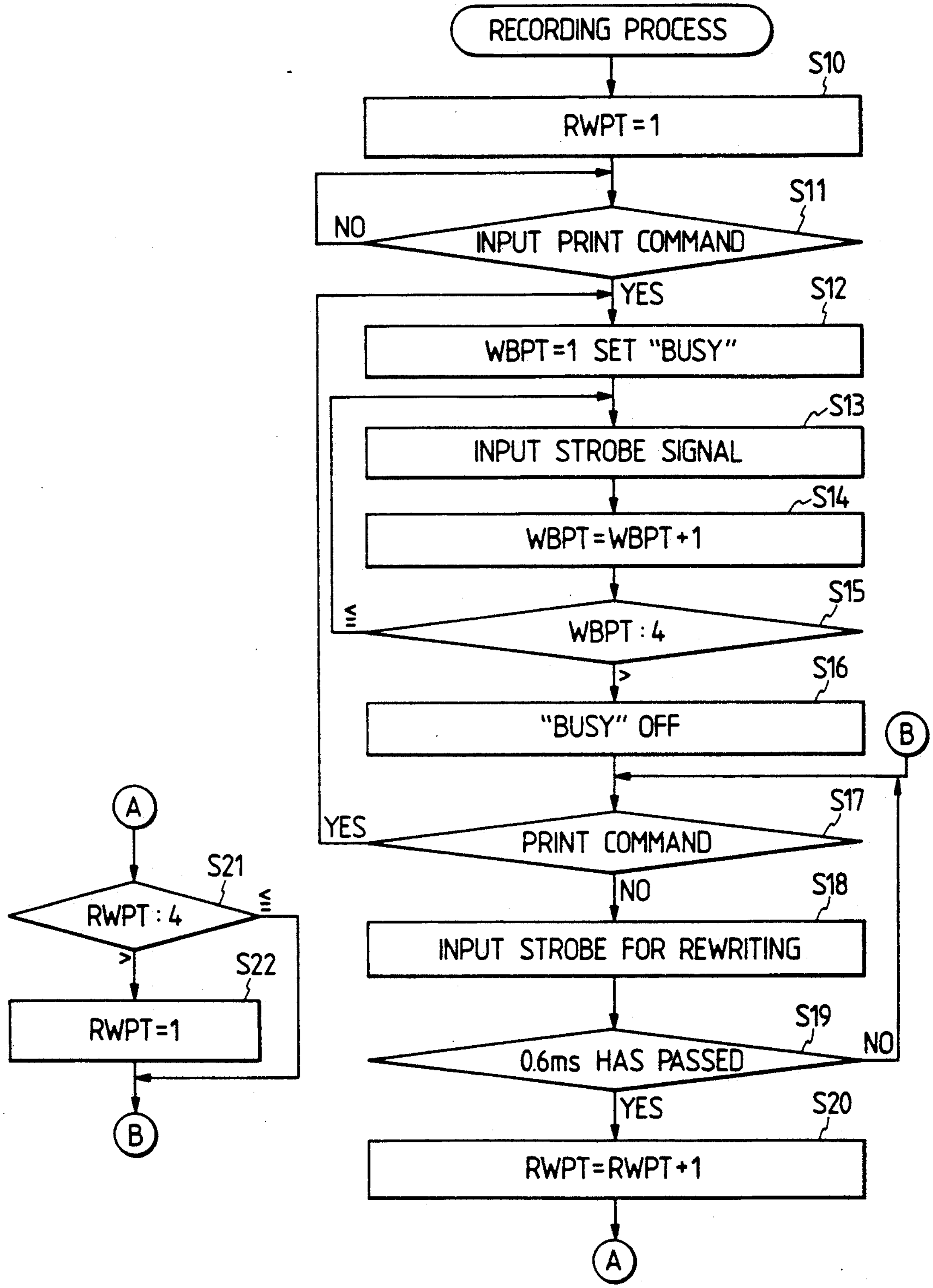
FIG. 4 is a flow chart showing the recording operation of a recording control unit.

FIG. 4 is a flow chart showing the recording process in the recording control unit 103 of the present embodiment, and a control program for executing this process is stored in the ROM 121.

At step S10, the recording control unit 103 sets the rewrite pointer RWPT of the RAM 124 to "1", and at step S11, it waits for the print command 109 being input from the control unit 101. The process up to this step is executed by the closing of the power source switch of the apparatus, i.e., by the copy command being input.

When the print command 109 from the control unit 101 output by the step S6 is input, advance is made to step S12. At the step S12, the writing block pointer WBPT is set to "1" and the "busy" of the status signal 108 is set, and the inputting of the recording data of the next one line from the control unit 101 is inhibited. At step S13, a strobe signal corresponding to the value of the writing block pointer WBPT is output, and a block of the thermal head 104 designated by the writing block pointer WBPT is driven for heat generation for a predetermined time. In this embodiment, the driving time (the power application time) of said block is about 0.6 msec. per block. When the driving of one block is thus completed, the writing block pointer WBPT is incremented by +1, and steps S13-S15 are executed to carry out the recording of one line until it is judged at step S15 that the writing block pointer WBPT is greater than "4", i.e., until the recording by the four blocks is completed.

When the recording of one line is thus completed, advance is made to step S16, where the "busy" of the status signal 108 is rendered OFF and the inputting of the recording data of the next line is permitted. At step S17, whether the next print command has been input is examined, and if the next print command is input, advance is made to step S12, where the aforedescribed process is executed.

If the next print command is not input, advance is made to step S18, where a corresponding strobe signal is output to a block indicated by the rewrite pointer RWPT and the thermal head 104 is again driven for heat generation.

Further, at step S19, whether a power supply time of 0.6 msec. has passed is examined, and if it has not passed, return is made to step S17, where whether a print command 109 has been input from the control unit 101 is examined. If the print command 109 has been input, the driving of the thermal head 104 for heat generation is immediately stopped and return is made to step S12. If the print command 109 is not input and at step S19, for example, 0.2 msec.–0.3 msec. passes, advance is made to step S20, where the rewrite pointer RWPT is incremented by +1, and at step S21, whether the rewrite pointer RWPT has become greater than "4" is examined. If the rewrite pointer RWPT is "4" or less, advance is made to step S17, where the inputting of the print command 109 is checked again. If the rewrite pointer RWPT becomes greater than "4", advance is made to step S22, where the rewrite pointer RWPT is set to "1", and advance is made to step S17.

Thereby, block numbers for starting the rewrite (i.e., again applying energy to the heat generating elements H of the thermal head 104 in block unit) at a temperature lower than the printing temperature are successively renewed and thus, the rewrite is not carried out always from the same block number of the thermal head 104.

Figure 5A:
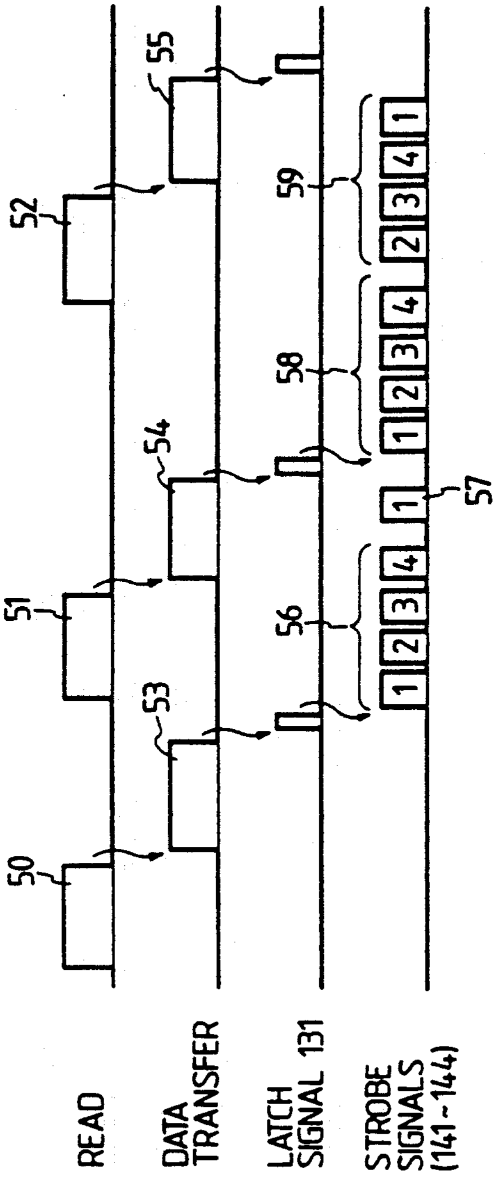
FIG. 5A illustrates the timing during the copying operation of an embodiment of the present invention.
Figure 5B:
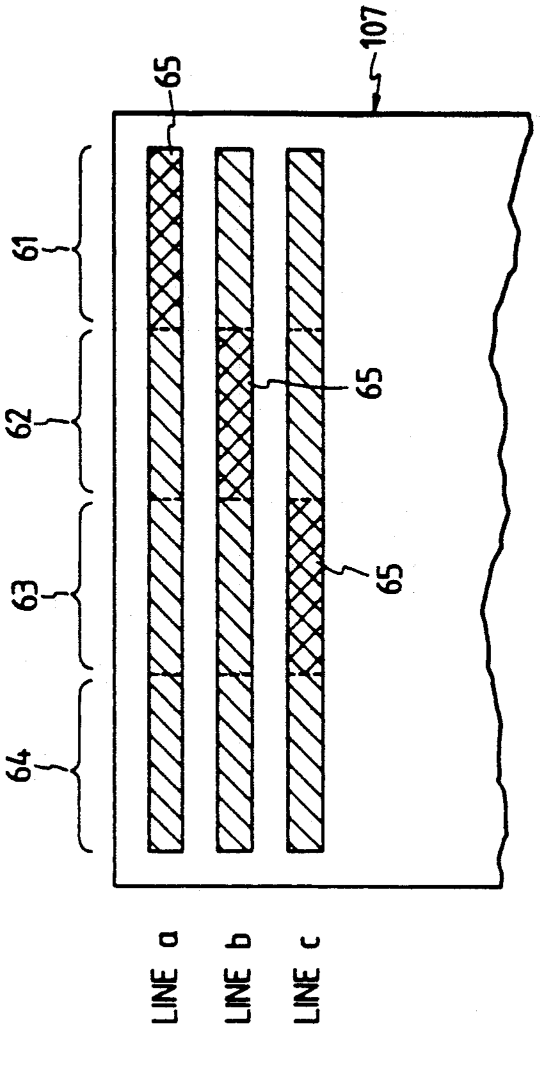
FIG. 5B shows the result recorded by the rewrite of an embodiment of the present invention.

FIGS. 5A and 5B are timing charts illustrating the reading operation and the printing process in the facsimile apparatus of the present embodiment.

In these figures, the reference numerals 50–52 designate timings showing the reading operation in the reading unit 100, and the reference numerals 53–55 denote timings of data transfer from the control unit 103 to the shift register 201 of the thermal head 104 which correspond to the reading timings 50–52, respectively. The reference numerals 56 and 58 designate actual print timings at which the blocks (1)–(4) are driven by strobe signals 141–144 to effect printing, and the reference numerals 57 and 59 denote rewrite timings for preheating the group of heat generating elements 203 of the thermal head 104. Here, at 57, the block (1) 151 is rewritten, and at 59, the four blocks (2) 152–(1) 151 are rewrite-driven in the named order for a predetermined time.

When one line of the original is read in the reading unit 100 by the reading timing designated by the reference numeral 50, the data thereof is transferred to the control unit 101. That data is then serially transferred to the thermal head 104 by the data transfer timing designated by the reference numeral 53. When the image data of one line is thus stored in the shift register 201 of the thermal head 104, the data of the shift register 201 is latched in the latch circuit 202 by the latch signal 131.

Thereafter, when the print command 109 is output from the control unit 101 to the recording control unit 103, the recording control unit 103 starts the recording operation, and as shown by the reference numeral 56, electric power is supplied to the block 151 (1) and so on, for example, for 0.4 msec.–0.6 msec. to drive the thermal head 104 for heat generation. When the recording of one line by the four blocks is thus completed, rewrite is effected on the block 151 (1) as shown by the reference numeral 57 if the next print command 109 is not input even if a predetermined time (e.g. 0.6 msec.) passes. In the embodiment shown in FIG. 5A, a print command 109 for the next one line is input from the control unit 101 immediately after the rewrite (57) of the block 151 and therefore, the rewrite is interrupted and advance is made to the recording operation for the next line as shown by the reference numeral 58.

When the second line is thus recorded at the reference numeral 58, rewrite is carried out at the reference numeral 59 because the next print command 109 is not yet input. As previously described, at this rewrite timing 59, all the four blocks are rewritten since the time from after the driving for heat generation is started from the block 152 (2) subsequent to the block 151 (1) driven for heat generation at the rewrite timing of the reference numeral 57 until a print command for the third line is input is long.

Thus, even when rewrite is carried out for each block in each line, the block for which rewrite is started slides in each of lines a–c and therefore, the portion 65 to be recorded darkly by rewrite slides in a similar manner. Thereby, that rewrite block portion becomes inconspicuous and the quality of printing is improved.

In FIG. 5B, the reference numerals 61–64 designate portions recorded by the blocks 151, 152, 153 and 154, respectively.

Figure 6A:
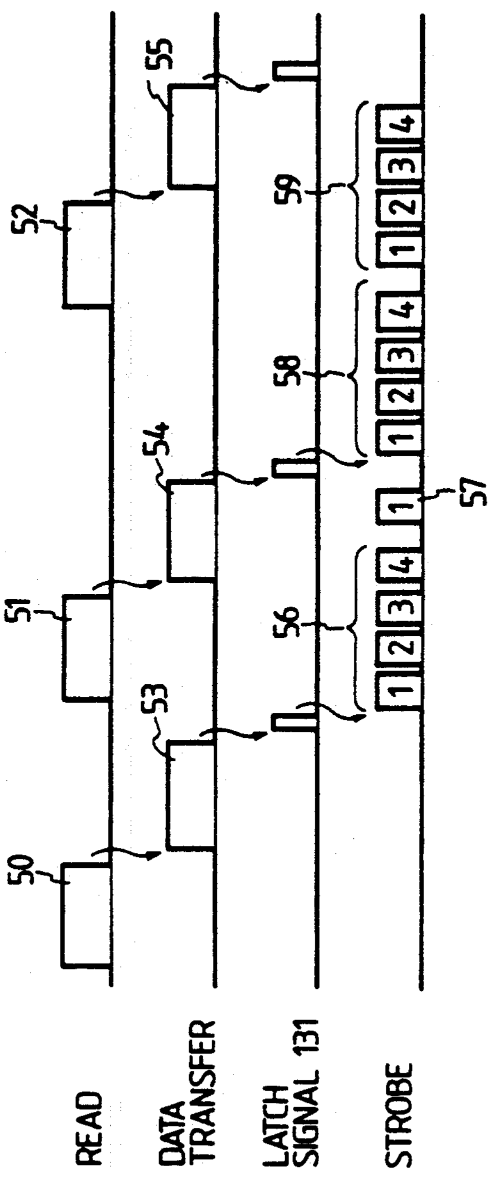
FIG. 6A (PRIOR ART)
FIGS. 6A and 6B show the timing of rewrite recording and an example of the recording thereby.
Figure 6B:
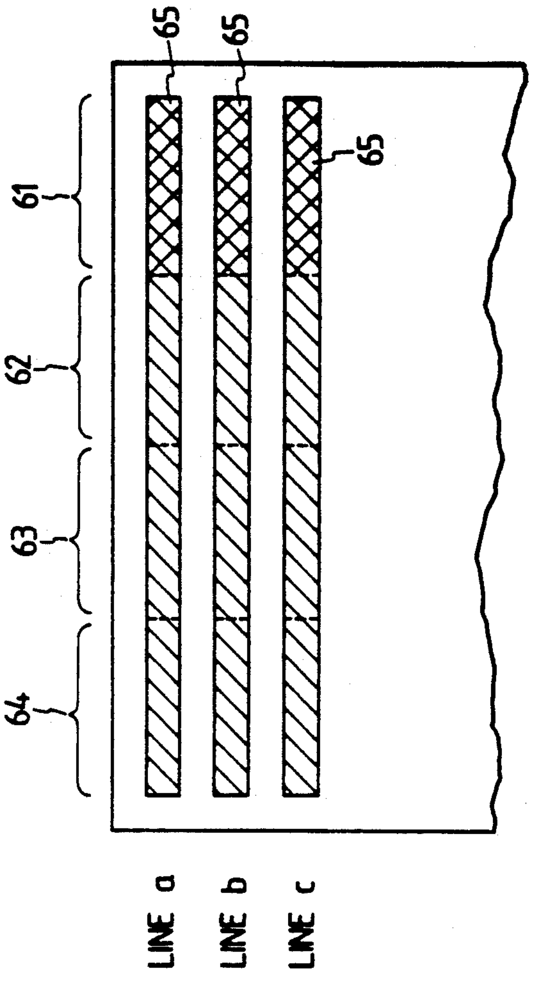
FIG. 6B (PRIOR ART)

In contrast, if as shown in FIG. 6, design is made such that rewrite is started always from the block 151 (1) at the rewrite timings 56 and 59, when one block alone is rewritten during the recording of the lines a–c, a dark portion 65 is created only in the portion 61 recorded by the block 1 and the dark portion appears like a stripe relative to the direction of conveyance of the recording paper. Accordingly, in the previously described embodiment, the block from which rewrite is started is selected to the block next to the last block which has been rewritten at the rewrite timing immediately before, whereby the inconvenience as shown in FIG. 6B is prevented from occurring.

Figure 7:
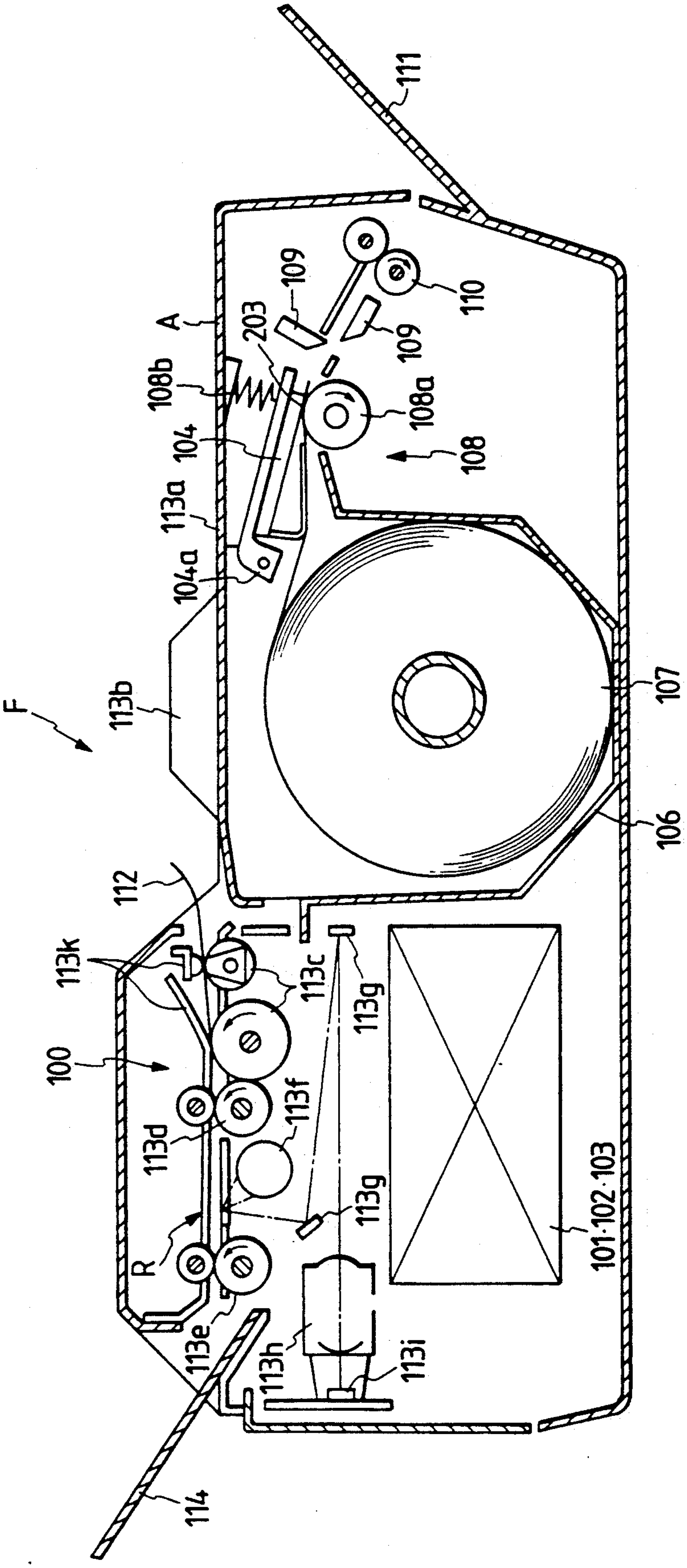
FIG. 7 is a side cross-sectional view of a facsimile apparatus to which an embodiment of the present invention is applied.

Reference is now had to FIG. 7 to describe a facsimile apparatus to which the previously described embodiment is applied.

In FIG. 7, the letter F designates a facsimile apparatus. The reference numeral 106 denotes a roll holder in which a roll of thermosensitive recording paper 107 is contained in a trapped fashion. In a recording station 108, recording is effected on the recording paper 107 contained in the roll holder 106, and after the recording, the recording paper 107 is cut from the trailing end of the image by a cutter 109, and is discharged outwardly of the apparatus and onto a tray 111 by a pair of discharge rollers 110.

Also in a recording portion 100, there are provided a platen roller 108*a* (driven by the aforementioned paper feed motor 105) for stepwisely conveying the recording paper 107, and the aforementioned line type thermal head 104 urged against the roller 108*a* by a spring 108*b*, and recording conforming to an image signal is effected on the thermosensitive paper 107. Designated by 104*a* is the rotational axis of the thermal head 104.

An original supporting table 113*a* provided on the upper surface of a cover A is provided in an original reading system 113. A plurality of originals 112 placed on the original supporting table 113*a* with their surfaces to the read facing downward have their both sides guided by a side guide 113*b* and are separated one by one by a separating roller 113*c*, whereafter they are stepwisely conveyed to a reading station R by a conveying roller 113*d*. The originals 112 having had their image-bearing surfaces read in the reading station R are discharged onto a discharge tray 114 by a discharge roller 113*e*. Denoted by 113*k* is a separating piece urged against the separating roller 113*c*.

While an original 112 is being conveyed through the original reading station R, the image-bearing surface thereof is irradiated by a light source 113*f*, and the reflected light therefrom passes to a CCD 113*i* via a plurality of mirrors 113*g* and a lens 113*h*, whereby the image of the original is read and as previously described, the image signal thereof is transmitted to the recording system of a host apparatus or other apparatus.

In the facsimile apparatus F of the present embodiment, the control of the thermal head as described with respect to the previous embodiment is then effected.

In this embodiment, description has been made on the basis of the copying operation in a facsimile apparatus, whereas the present invention is not restricted thereto, but of course is also applicable to the recording of received data from the communication control unit 102 which has received data transmitted from other facsimile apparatus. Also, as previously described, the present invention is not restricted to a facsimile apparatus, but of course is also applicable to ordinary thermal printers or the like including heat transfer printers.

Further, this embodiment has been described with respect to the case of a thermal line head, but if during the recording by a thermal head for serial recording, design is made such that rewrite is executed between rows of dots recorded, there will of course be obtained a similar effect.

As described above, according to this embodiment, the thermal head can be driven for heat generation at a predetermined period and therefore, the amount of heat accumulated in the thermal head can be made substantially constant and recording density can be made uniform.

Also, by the starting of the rewrite for preventing the cooling of the thermal head between the recording operations being set to the next to the block which has been driven last in the rewrite cycle immediately before, the same portion of record can be prevented from being always recorded darkly.

As described above, according to the present invention, there can be provided a recording apparatus which ensures constant recording density.

I claim:

1. A recording apparatus for recording on a recording medium, said apparatus comprising:

a plurality of recording elements disposed in a plurality of block units;

heat generating driving means for driving said recording elements for heat generation by said block units; and control means for preheat driving said recording elements by said block units in a sequential manner during a non-recording period when said recording elements are not driven to record, the preheat driving being started with a different one of said block units of said recording elements than a block unit which was last driven to generate heat during a previous non-recording period, a duration of said non-recording period being variable.

2. A recording apparatus according to claim 1, wherein said control means controls so that the preheat driving is successively continued in a one of said block units until a next recording command is given.

3. A recording apparatus according to claim 1, wherein said control means retains an identity of one of said block unit which was last driven to generate heat during said non-recording period.

4. A recording apparatus according to claim 1, wherein said recording elements are provided in a thermal head, and said recording elements are driven for heat generation by each of said block units sequentially by a strobe signal produced from a recording control unit.

5. A recording apparatus according to claim 4, wherein said strobe signal is output from said recording control unit correspondingly to each of said block units.

6. A recording apparatus according to claim 1, wherein a heat generation driving time of each of said block units is determined by an output time of a strobe signal produced from a recording control unit.

7. A recording apparatus according to claim 1, wherein said recording elements are driven for preheat generation by block unit during a non-recording operation for a time which is shorter than a heat generation driving time for a recording operation.

8. A recording method for recording on a recording medium, wherein a plurality of recording elements disposed in a plurality of block units can be driven for heat generation by said block units, said method comprising the steps of:

preheat driving said recording elements for heat generation by said block units in a sequential manner during a non-recording period starting with one of said block units of said recording elements which is different from another one of said block units which was last driven to generate heat during a previous non-recording period, a duration of said non-recording period being variable; and driving said recording elements by said block units in a sequential manner during a recording operation.

9. A recording apparatus according to claim 8, wherein an identity of one of said block units which has been last preheat-driven during said non-recording operation is stored and a next preheat driving is performed for a next one of said block units.

10. A facsimile apparatus comprising:

a reading unit for reading an image of an original;

a head having a plurality of heat generating elements disposed in a plurality of block units;

a heat generating driving means for driving said heat generating elements for heat generation by said block units; and control means for preheat-driving said heat generating element for heat generation by said block units sequentially and during a non-recording period when said elements are not driven to record, and staring to preheat-drive beginning with a one of said block units of said heat generating elements which is different from another one of said block units which was last driven to generate heat during a previous non-recording period, a duration of said non-recording period being variable.

11. A facsimile apparatus according to claim 10, wherein said control means retains an identity of one of said block units which was last driven to generate heat during said non-recording period.

12. A recording apparatus for recording on a recording medium with a head, said apparatus comprising:

driving means for driving a plurality of heat generating elements of said head by a plurality of block units, said heat generating elements being disposed in said plurality of block units; and selecting means for sequentially selecting which of said plurality of block units is to be driven during a given non-recording operation, and for selecting at a start of a new non-recording operation a one of said block units which is different from another one of said block units which was last driven during a previous non-recording operation, a duration of said non-recording operation being variable.

13. A recording apparatus according to claim 1, wherein said recording apparatus is designed for use in an ink jet recording system.

14. A recording apparatus according to claim 8, wherein said recording method is used in an ink jet recording system.

15. A facsimile apparatus according to claim 10, wherein said facsimile apparatus is designed for use in an ink jet recording system.

16. A recording apparatus according to claim 12, wherein said recording apparatus is designed for use in an ink jet recording system.

17. A recording apparatus according to claim 1, wherein said recording apparatus is designed for use in a facsimile system.

18. A recording apparatus according to claim 8, wherein said recording method is used in a facsimile system.

19. A recording apparatus according to claim 12, wherein said recording apparatus is designed for use in a facsimile system.

20. A recording apparatus according to claim 1, wherein the duration of said non-recording period varies in response to an input period of recording data.

21. A recording apparatus according to claim 1, wherein said control means drives to preheat drive a one of said block units which was next to said block unit which was last driven in the previous non-recording period.

22. A recording apparatus according to claim 8, wherein the duration of said non-recording period varies in response to an input period of recording data.

23. A recording apparatus according to claim 8, further comprising the step of preheat driving a one of said block units which is next to said block unit which was last driven in the previous non-recording period.

24. A facsimile apparatus according to claim 10, wherein the duration of said non-recording period varies in response to an input period of recording data.

25. A facsimile apparatus according to claim 10, wherein said control means causes preheat driving of a one of said block units which was next to said another one of said block units which was last driven in the previous non-recording period.

26. A recording apparatus according to claim 12, wherein the duration of said non-recording operation varies in response to an input period of recording data.

27. A recording apparatus according to claim 12, wherein said selecting means first selects a one of said block units which is next to said another one of said block units which was last driven in the previous non-recording period.

* * * * *

UNITED STATES PATENT AND TRADEMARK OFFICE

CERTIFICATE OF CORRECTION

PATENT NO. : 5,172,130

DATED : December 15, 1992

INVENTOR(S) : MASATOMO TAKAHASHI

It is certified that error appears in the above-identified patent and that said Letters Patent is hereby corrected as shown below:

On the title page : Item

IN [56] REFERENCES CITED

Under U.S. PATENT DOCUMENTS,
"4,449,137 5/1986 Inui" should read
--4,449,137 5/1984 Inui et al.--.

COLUMN 1

Line 58, "a" should be deleted.

COLUMN 2

Line 28, "applied" should read --applied.--.

COLUMN 4

Line 3, "correspond" should read --corresponding--.

COLUMN 8

Line 47, "apparatus" should read --method--.
Line 60, "element" should read --elements--.
Line 63, "staring" should read --starting--.

COLUMN 9

Line 25, "apparatus" should read --method--.

UNITED STATES PATENT AND TRADEMARK OFFICE
CERTIFICATE OF CORRECTION

PATENT NO. : 5,172,130

DATED : December 15, 1992

INVENTOR(S) : MASATOMO TAKAHASHI

It is certified that error appears in the above-identified patent and that said Letters Patent is hereby corrected as shown below:

COLUMN 10

Line 1, "apparatus" should read --method--.
Line 15, "apparatus" should read --method--.
Line 18, "apparatus" should read --method--.

Signed and Sealed this

Sixteenth Day of November, 1993

Attest:

BRUCE LEHMAN

Attesting Officer

*Commissioner of Patents and Trademarks*